US012776086B2

(12) United States Patent
Sachdeva et al.

(10) Patent No.: US 12,776,086 B2
(45) **Date of Patent: *Oct. 27, 2026**

(54) METHOD AND SYSTEM FOR GENERATING AN ANIMATION FROM A STATIC IMAGE

(71) Applicant: Samsung Electronics Co., Ltd., Suwon-si (KR)

(72) Inventors: Kapil Sachdeva, Noida (IN); Neha Agarwal, Noida (IN)

(73) Assignee: Samsung Electronics Co., Ltd., Suwon-si (KR)

( * ) Notice: Subject to any disclaimer, the term of this patent is extended or adjusted under 35 U.S.C. 154(b) by 36 days.

This patent is subject to a terminal disclaimer.

(21) Appl. No.: 18/804,810

(22) Filed: Aug. 14, 2024

(65) Prior Publication Data

US 2024/0404162 A1 Dec. 5, 2024

Related U.S. Application Data

(63) Continuation of application No. 17/882,102, filed on Aug. 5, 2022, now Pat. No. 12,094,044, which is a (Continued)

(30) Foreign Application Priority Data

Aug. 19, 2021 (IN) ............................. 202111037582

(51) Int. Cl.
*G06T 13/40* (2011.01)
*G06T 19/00* (2011.01)

(52) U.S. Cl.
CPC ............ *G06T 13/40* (2013.01); *G06T 19/006* (2013.01)

(58) Field of Classification Search
None
See application file for complete search history.

(56) References Cited

U.S. PATENT DOCUMENTS

| | | | |
|---|---|---|---|
| 6,873,327 | B1 | 3/2005 | Edwards et al. |
| 8,508,550 | B1 | 8/2013 | Jenny |

(Continued)

FOREIGN PATENT DOCUMENTS

| | | | |
|---|---|---|---|
| CN | 102945562 A | 2/2013 | |
| GB | 2 556 942 A | 6/2018 | |

(Continued)

OTHER PUBLICATIONS

Victor Tangermann, Photo Wake Up, This Algorithm Can Create 3D Animations From a Single Still Image, Dec. 23, 2018, https://futurism.com/algorithm-3d-animations-still-image.

(Continued)

*Primary Examiner* — Sultana M Zalalee
(74) *Attorney, Agent, or Firm* — Jefferson IP Law, LLP

(57) ABSTRACT

A method and a system for generation of an animation from a static image are provided. The system includes a scene and context analysis module which is configured to analyze the static image to determine a scene category, a plurality of objects, and a plurality of scene attributes. The scene and context analysis module is further configured to identify a user context. The system further includes an object correlator of an animation selection module which is configured to determine correlation among the plurality of objects based on the plurality of scene attributes. Further, a movement area identifier of the animation selection module is configured to analyze a movement area of the plurality of objects based on the correlation, the plurality of scene attributes and the scene category. An object prioritizer of the animation selection module is configured to prioritize at least one of the objects of the plurality of objects.

20 Claims, 17 Drawing Sheets

Related U.S. Application Data continuation of application No. PCT/KR2022/010226, filed on Jul. 13, 2022.

(56) References Cited

U.S. PATENT DOCUMENTS

| | | | |
|---|---|---|---|
| 9,087,395 | B1 | 7/2015 | Amacker |
| 9,183,658 | B2 | 11/2015 | Maloney et al. |
| 10,198,846 | B2 | 2/2019 | Carr |
| 10,586,367 | B2 | 3/2020 | Ravindran et al. |
| 10,969,876 | B1 | 4/2021 | Michaels et al. |
| 10,984,574 | B1 | 4/2021 | De Ridder et al. |
| 11,055,894 | B1 | 7/2021 | Kreter et al. |
| 11,176,678 | B2 | 11/2021 | Choi et al. |
| 12,094,044 | B2 * | 9/2024 | Sachdeva ............... G06V 10/82 |
| 2007/0085853 | A1 | 4/2007 | Smith et al. |
| 2009/0315978 | A1 | 12/2009 | Wurmlin et al. |
| 2012/0154390 | A1 | 6/2012 | Narita et al. |
| 2014/0198101 | A1 | 7/2014 | Vilkin et al. |
| 2015/0117777 | A1 | 4/2015 | Hsun |
| 2016/0314609 | A1 | 10/2016 | Taylor et al. |
| 2018/0053333 | A1 | 2/2018 | Carr |
| 2018/0089512 | A1 | 3/2018 | Traff |
| 2018/0172557 | A1 | 6/2018 | Ghidotti Piovan et al. |
| 2018/0374252 | A1 | 12/2018 | Laaksonen et al. |
| 2019/0019320 | A1 | 1/2019 | Ravindran et al. |
| 2020/0058128 | A1 | 2/2020 | Choi et al. |
| 2020/0349765 | A1 | 11/2020 | Iwamoto et al. |
| 2020/0357184 | A1 | 11/2020 | Paul et al. |
| 2021/0048975 | A1 | 2/2021 | Panwar et al. |
| 2021/0178591 | A1 | 6/2021 | Floyd-Jones et al. |
| 2021/0383115 | A1 | 12/2021 | Alon et al. |
| 2022/0076473 | A1 | 3/2022 | Jeon |
| 2022/0076489 | A1 | 3/2022 | Mishra et al. |
| 2023/0343106 | A1 | 10/2023 | Itsumi et al. |

FOREIGN PATENT DOCUMENTS

| | | | |
|---|---|---|---|
| JP | 2012-133543 | A | 7/2012 |
| JP | 2020-513123 | A | 4/2020 |
| KR | 10-2019-0020281 | A | 2/2019 |
| KR | 10-2019-0086770 | A | 7/2019 |
| KR | 10-2019-0122859 | A | 10/2019 |
| KR | 10-2020-0076647 | A | 6/2020 |
| WO | 2009/131275 | A1 | 10/2009 |
| WO | 2020/075098 | A1 | 4/2020 |

OTHER PUBLICATIONS

Hillary K. Grigonis, Picture this: PhotoMirage creates moving images from still photographs, Jul. 10, 2018, https://www.digitaltrends.com/photography/corel-photomirage-announced/.

International Search Report and Written Opinion dated Oct. 26, 2022, issued in International Patent Application No. PCT/KR2022/010226.

Indian Office Action dated Sep. 6, 2023, issued in Indian Patent Application No. 202111037582.

European Search Report dated Jul. 5, 2024, issued in European Application No. 22858613.7.

Chinese Office Action dated Aug. 28, 2026, issued in Chinese Patent Application No. 202280035045.5.

* cited by examiner

METHOD AND SYSTEM FOR GENERATING AN ANIMATION FROM A STATIC IMAGE

CROSS REFERENCE TO RELATED APPLICATION(S)

This application is a continuation application of prior application Ser. No. 17/882,102 filed on Aug. 5, 2022, which is a continuation application claiming priority under § 365(c) of an International application No. PCT/KR2022/010226 filed on Jul. 13, 2022, and which is based on and claims the benefit of an Indian patent application No. 202111037582 filed on Aug. 19, 2021 in the Indian Patent Office, the disclosure of each of which is incorporated by reference in its entirety.

BACKGROUND

1. Field

The disclosure relates to animation of a static image in real time. More particularly, the disclosure relates to a method and a system for automatically generating context specific animation from the static image by identifying a plurality of objects to be animated in the static image. Further, it automatically animates the static image by taking the animation decision in real time on receipt of a trigger event.

2. Description of Related Art

As digital technology is evolved, animation always wins in grabbing a user's attention when it comes to animation versus static image. Animation always attracts more users than static images. Animation is, at its core, a storytelling mechanism, one which people are familiar with and can be very easily understood. Image processing is an emerging trend these days, use of Artificial Intelligence for analyzing the image and then performing action for better user experience and ease.

In one of the conventional techniques, there is no support to auto generate the animation from a single still image based on the context and ambience. In another conventional technique, the audio/visuals may be generated from current multiple images but there is no support to generate animations from a single image without user intervention. Additionally, in existing solutions, the still image animation methods either need user intervention or specific inputs like sequence of images or some reference videos.

There are various techniques provided for animation via multiple images wherein a sequence of related frames are given and an animation is produced using multiple images. But it requires the need of series of related images/frames for generating animation. Another technique involves a user to open the image in the editing tool, mark the area which needs animation and then animation is applied on that image. The limitation in this technique is that it requires manual editing. Another technique involves animating via three-dimensional (3D) model wherein it animates some specific images which has a walkable 3D object like human, its 3D model is converted and it walks out of screen. The limitation in this solution is that it works on specific images which have a walking model and need an Augmented Reality device for viewing the effect.

For example, U.S. Pat. No. 10,198,846B2 describes a digital image animation. In this disclosure, the method discloses generating and saving animations. The animations are used for a single digital image to permit movement or other effects to be exhibited as part of the digital image without requiring multiple frames as in conventional techniques. Transformation of the single digital image by the animations may also be coordinated, such as to synchronize or not synchronize movement of objects to promote realism. In another example, portions and even an entirety of these techniques may be performed automatically and without user intervention. Machine learning, for instance, may be employed using a neural network to classify the digital image into one or more semantic classes. The semantic classes may then be used to recommend animations to transform the digital image. However, in this patent there is no focus on how to generate animations and it does not consider user context for deciding the animation.

Another United States patent US20200058128A1 describes a method and an apparatus for applying dynamic effect to an image. This method uses an image processing method including acquiring depth information on at least one of a first portion of a specific object included in a target image or a second portion in a region of the target image that excludes the specific object based on reference pattern information, the reference pattern information including first information on a shape of an object included in an image and second information on a relative position between at least two objects included in the image, and applying a dynamic effect to at least one of the first portion or the second portion based on the acquired depth information may be provided. However, this patent does not disclose applying automatic animation to still images in real time.

In view of the above deficiencies mentioned in the conventional approaches, there is a need to have a technical solution to ameliorate one or more problems of the conventional problems or to at least provide a solution to provide animation to a static image in real time, identifying a plurality of animation objects, find their movement and effect and animating the animation objects on receipt of any trigger event. Further, such methods and systems are required that help in improvising the traditional way of displaying wallpapers.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide introducing concepts related to generation of an animation from a static image in real time, identifying a plurality of animation objects, find their movement and effect and animating the animation objects on receipt of any trigger event. This summary is neither intended to identify essential features of the disclosure nor is it intended for use in determining or limiting the scope of the disclosure.

Additional aspects will be set forth in part in the description which follows and, in part, will be apparent from the description, or may be learned by practice of the presented embodiments.

In accordance with an aspect of the disclosure, a method for generation of an animation from a static image is provided. The method includes the static image for determining a scene category, a plurality of objects, and a plurality of scene attributes. The plurality of scene attributes includes Axis Aligned Bounding Boxes (AABBs), Orientation Bounding Boxes (OBBs) and the like. The method further includes identifying a user context and determining correlation among the plurality of objects based on the plurality of scene attributes. Here, the correlation among the plurality of objects can be determined using Pearson's correlation coefficient. Further, the method includes analyzing a movement area of the plurality of objects based on the correlation, the plurality of scene attributes and the scene category. It further includes prioritizing at least one of the objects of the plurality of objects based on the analyzed movement area, the scene attributes and the user context. Further, a displacement area is analyzed for the at least one of the prioritized objects of the plurality of objects and the at least one of the prioritized objects is animated and rendered within the identified displacement area for generating the animation from the static image.

In the embodiment, the user context further includes analyzing user surroundings that includes ambience of a user, background noise from multiple sensors, weather, occasion, lighting condition, location of the user and the like. Further, the user context can be determined based on the analyzed user surroundings and the plurality of objects based on the user context are identified.

In accordance with another aspect of the disclosure, a system for generating an animation is provided. The system includes a scene and context analysis module which is configured to analyze the static image to determine a scene category, a plurality of objects, and a plurality of scene attributes. The plurality of scene attributes includes Axis Aligned Bounding Boxes (AABBs), Orientation Bounding Boxes (OBBs) and the like. The scene and context analysis module is further configured to identify a user context. The system further includes an object correlator of an animation selection module which is configured to determine correlation among the plurality of objects based on the plurality of scene attributes. Here, the correlation among the plurality of objects can be determined as Pearson's correlation coefficient. Further, a movement area identifier of the animation selection module is configured to analyze a movement area of the plurality of objects based on the correlation, the plurality of scene attributes and the scene category. An object prioritizer of the animation selection module is configured to prioritize at least one of the objects of the plurality of objects based on the analyzed movement area, the scene attributes and the user context. Further, the system includes a displacement area identifier of a direction, speed and displacement module is configured to identify a displacement area for the at least one of the prioritized objects of the plurality of objects and a rendering module is configured to animate and render the at least one of the prioritized objects within the identified displacement area to generate the animation from the static image.

In the embodiment, the scene and context analysis module is further configured to analyze user surroundings including ambience of a user, background noise from multiple sensors, weather, occasion, lighting condition, location of the user and the like. It is further configured to determine the user context based on the analyzed user surroundings and identify the plurality of objects based on the user context.

In another embodiment, the method further includes identifying association between the plurality of objects and the relevance of the plurality of objects with respect to the static image.

In another embodiment, the method further includes classifying the plurality of objects as movable or immovable with respect to the static image and identifying the movement area of the classified objects, wherein the movement area is one of outside the bounding box and within the bounding box of the object. The movement area of the classified objects which is outside the bounding box is relative to another object of the plurality of objects.

In another embodiment, the method further includes identifying an animation effect to be applied on each of the plurality of objects. Additionally, at least one new animation object can also be identified based on the scene category, the plurality of objects and the plurality of scene attributes. Further, the method includes identifying at least one new animation effect for one of the plurality of objects, classified as immovable based on the user context, the scene category and the plurality of scene attributes. The animation effect to be applied on one of the plurality of objects, classified as movable, can be motion. Further, the at least one new animation effect includes blinking, change in the color, rotation and the like. Furthermore, the movement area for each new animation effect is within the bounding box of the corresponding object of the plurality of objects.

In another embodiment, the method further includes associating each of the plurality of objects with a priority score and prioritizing at least one of the objects of the plurality of objects with the priority score greater than a threshold. In one non-limiting example, the prioritizing of the at least one of the objects of the plurality of objects with the priority score greater than a threshold can be based on a decision tree model.

In another embodiment, the method further includes identifying direction of the plurality of objects based on the AABBs and the OBBs and identifying speed of the plurality of objects by using a regression model. Further, the animation is generated based on the direction and the speed of the plurality of objects. The at least one of a pre-trained dataset and a customized dataset is augmented to input in the regression model.

In another embodiment, the method further includes calculating the displacement area based on object segmentation and color thresholding.

In another embodiment, the method further includes calculating a mask of the movement area with respect to one of the plurality of objects to be animated.

In another embodiment, the generation of animation from the static image is based on an activation event such as gazing, manual event, time-based event, user context change and the like.

In another embodiment, the object correlator of the animation selection module is further configured to identify association between the plurality of objects and relevance of the plurality of objects with respect to the static image.

In another embodiment, the movement area identifier of the animation selection module is further configured to classify the plurality of objects as movable or immovable with respect to the static image and identify the movement area of the classified objects, wherein the movement area is one of outside the bounding box and within the bounding box. The movement area of the classified objects which is outside the bounding box is relative to another object of the plurality of objects.

In another embodiment, the system further includes an animation effect identifier of the animation selection module which is configured to identify an animation effect to be applied on each of the plurality of objects. The system further includes a new object identifier of the animation selection module which is configured to identify at least one new animation object based on the scene category, the plurality of objects and the plurality of scene attributes. The animation effect identifier of the animation selection module is further configured to identify at least one new animation effect for one of the plurality of objects, classified as immovable based on the user context, the scene category and the plurality of scene attributes. The animation effect to be applied on one of the plurality of objects, classified as movable, can be motion. Further, the at least one new animation effect includes blinking, change in the color, rotation and the like. Furthermore, the movement area for each new animation effect is within the bounding box of the corresponding object of the plurality of objects.

In another embodiment, the object prioritizer of the animation selection module is further configured to associate each of the plurality of objects with a priority score and prioritize at least one of the objects of the plurality of objects with the priority score greater than a threshold. The prioritizing of the at least one of the objects of the plurality of objects with the priority score greater than a threshold can be based on a decision tree model.

In another embodiment, the system further includes a direction identifier of the direction, speed and displacement module which is configured to identify direction of the plurality of objects based on the AABBs and the OBBs. It further includes a speed identifier of the direction, speed and displacement module which is configured to identify speed of the plurality of objects by using a regression model. The rendering module is configured to generate the animation based on the direction and the speed of the plurality of objects. The at least one of a pre-trained dataset and a customized dataset is augmented to input in the regression model.

In another embodiment, the displacement area identifier of a direction, speed and displacement module is further configured to calculate the displacement area based on object segmentation and color thresholding.

In another embodiment, the displacement area identifier of the direction, speed and displacement module is further configured to calculate a mask of the movement area with respect to one of the plurality of objects to be animated.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Figure 1:
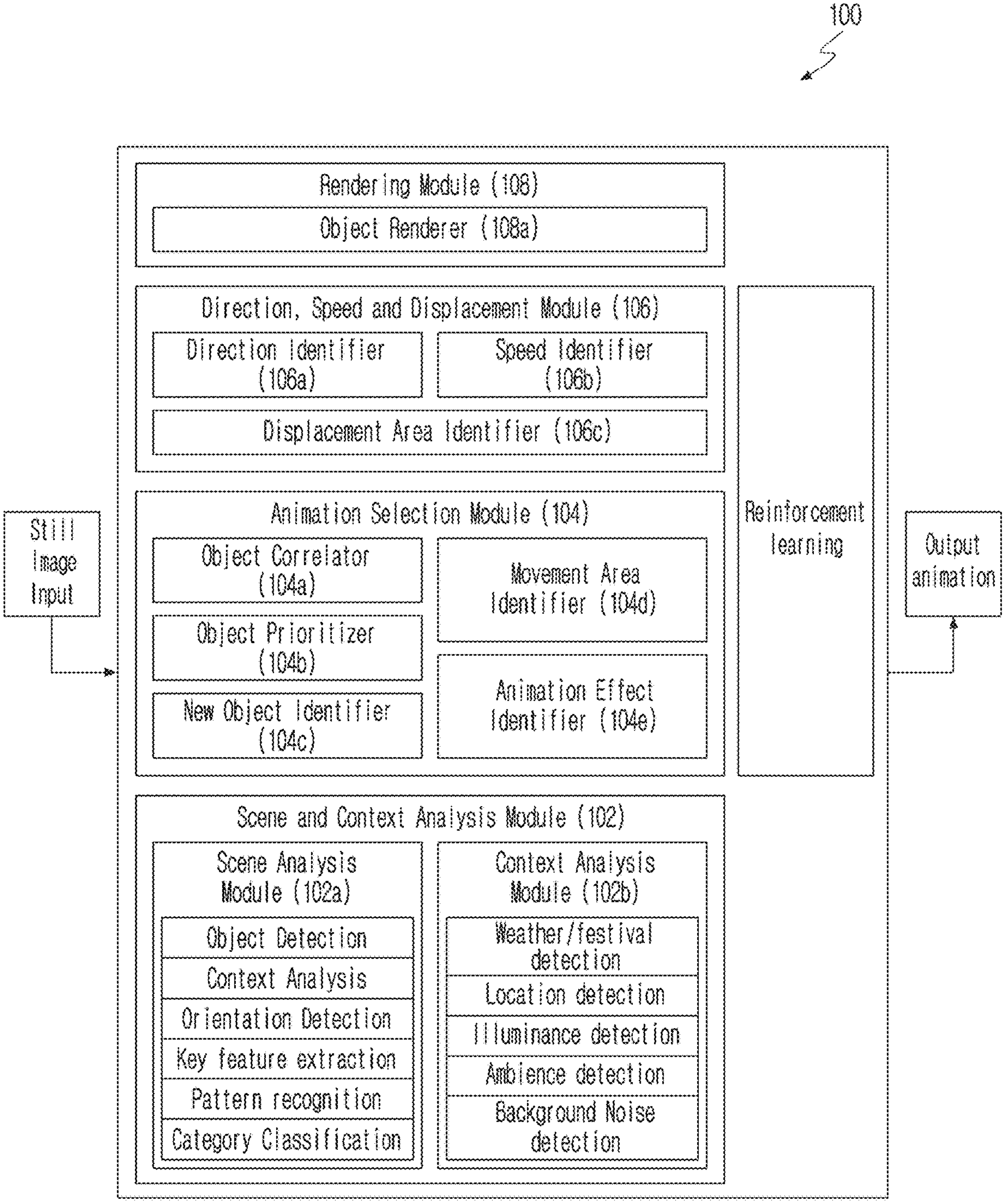
FIG. 1 illustrates a schematic block diagram of the overall architecture of a system for generation of an animation of a static image, according to an embodiment of the disclosure.

It should be appreciated by those skilled in the art that any block diagrams herein represent conceptual views of illustrative apparatuses embodying the principles of the disclosure. Similarly, it will be appreciated that any flow charts, flow diagrams, and the like represent various processes which may be substantially represented in computer readable medium and so executed by a computer or processor, whether or not such computer or processor is explicitly shown.

Throughout the drawings, like reference numerals will be understood to refer to like parts, components, and structures.

DETAILED DESCRIPTION

The various embodiments of the disclosure provides a method and system for animation of a static image in real time. The disclosure, more particularly, relates to a method and system for automatically generating context specific animation from a static image by identifying objects to be animated in the static image based on correlation between a plurality of objects, identification of one of the object's movement area and context based prioritization of objects. Additionally, the disclosure also includes displacement area determination of the prioritized objects.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Further, structures and devices shown in the figures are illustrative of various embodiments of the claimed subject matter and are meant to avoid obscuring of the claimed subject matter.

Furthermore, connections between components, modules, and/or circuits within the figures are not intended to be limited to direct connections. Rather, these components, modules, and/or circuits may be modified, re-formatted or otherwise changed by intermediary components, modules, and/or circuits.

The claimed subject matter provides an improved method and a system for automatically generating context specific animation from a static image.

For example, various embodiments herein may include one or more methods and systems generating an animation of a static image. In one of the embodiments, a static image is animated in real time by identifying the best animation object in the image, its displacement, speed and direction. The identification of animation objects from the static image is based on the scene category, user context and object motion area. Further, object correlation is identified between plurality of objects in the static image. Based on the object correlation, the movement area of the plurality of objects is identified. Further, prioritization of objects is done based on the movement area of the plurality of objects to identify the best suited animation object. Further, the displacement area of the animation object is identified.

A static image can have a plurality of movable objects, but all these objects are not best suitable for animation in the static image. An object can be best suited for animation in one image, but may not be a best match for another image. The detailed explanation of the prioritization of objects is explained in further description.

In another embodiment, the method includes the static image for determining a scene category, a plurality of objects, and a plurality of scene attributes. The plurality of scene attributes includes Axis Aligned Bounding Boxes (AABBs), Orientation Bounding Boxes (OBBs) and the like. The method further includes identifying a user context and determining correlation among the plurality of objects based on the plurality of scene attributes. Here, the correlation among the plurality of objects can be determined as Pearson's correlation coefficient. Further, the method includes analyzing a movement area of the plurality of objects based on the correlation, the plurality of scene attributes and the scene category. It further includes prioritizing at least one of the objects of the plurality of objects based on the analyzed movement area, the scene attributes and the user context. Further, a displacement area is analyzed for the at least one of the prioritized objects of the plurality of objects and the at least one of the prioritized objects is animated and rendered within the identified displacement area for generating the animation from the static image.

In another embodiment, the system includes a scene and context analysis module which is configured to analyze the static image to determine a scene category, a plurality of objects, and a plurality of scene attributes. The plurality of scene attributes includes Axis Aligned Bounding Boxes (AABBs), Orientation Bounding Boxes (OBBs) and the like. The scene and context analysis module is further configured to identify a user context. The system further includes an object correlator of an animation selection module which is configured to determine correlation among the plurality of objects based on the plurality of scene attributes. Here, the correlation among the plurality of objects can be determined as Pearson's correlation coefficient. Further, a movement area identifier of the animation selection module is configured to analyze a movement area of the plurality of objects based on the correlation, the plurality of scene attributes and the scene category. An object prioritizer of the animation selection module is configured to prioritize at least one of the objects of the plurality of objects based on the analyzed movement area, the scene attributes and the user context. Further, the system includes a displacement area identifier of a direction, speed and displacement module is configured to identify a displacement area for the at least one of the prioritized objects of the plurality of objects and a rendering module is configured to animate and render the at least one of the prioritized objects within the identified displacement area to generate the animation from the static image.

In another embodiment, the user context further includes analyzing user surroundings that includes ambience of a user, background noise from multiple sensors, weather, occasion, lighting condition, location of the user and the like. Further, the user context can be determined based on the analyzed user surroundings and the plurality of objects based on the user context are identified.

In another embodiment, the scene and context analysis module is further configured to analyze user surroundings including ambience of a user, background noise from multiple sensors, weather, occasion, lighting condition, location of the user and the like. It is further configured to determine the user context based on the analyzed user surroundings and identify the plurality of objects based on the user context.

It should be noted that the description merely illustrates the principles of the disclosure. It will thus be appreciated that those skilled in the art will be able to devise various arrangements that, although not explicitly described herein, embody the principles of the disclosure. Furthermore, all examples recited herein are principally intended expressly to be only for explanatory purposes to help the reader in understanding the principles of the disclosure and the concepts contributed by the inventor to furthering the art and are to be construed as being without limitation to such specifically recited examples and conditions. Moreover, all statements herein reciting principles, aspects, and embodiments of the disclosure, as well as specific examples thereof, are intended to encompass equivalents thereof.

FIG. 1 illustrates a schematic block diagram of the overall architecture of a system for generation of an animation of a static image, according to an embodiment of the disclosure.

The system 100 includes a plurality of modules such as a scene and context analysis module (102), an animation selection module (104), a direction, speed and displacement module (106) and a rendering module (108).

The scene and context analysis module (102) includes a scene analysis module (102*a*) and a context analysis module (102*b*). The scene and context analysis module (102) is configured to analyze the static image to identify a scene category, a plurality of objects, and a plurality of scene attributes. The plurality of scene attributes includes Axis Aligned Bounding Boxes (AABBs), Orientation Bounding Boxes (OBBs) and the like. Further, the analysis of the static image includes determining orientation of the plurality of objects, key features extraction of the plurality of objects, pattern recognition of the plurality of objects and scene category classification. The context analysis module (102*b*) is configured to analyze the user context such as weather, occasion, lighting condition location of the user, illuminance of user background, ambience of the user, background noise from multiple sensors, and the like.

The animation selection module (104) includes an object correlator (104*a*), an object prioritizer (104*b*), a new object identifier (104*c*), a movement area identifier (104*d*) and an animation effect identifier (104*e*). The object correlator (104*a*) is configured to determine the correlation among the plurality of objects based on the plurality of scene attributes. Based on the correlation, the plurality of scene attributes and the scene category, the movement area identifier (104*d*) is configured to analyze the movement area of the plurality of objects. Further, the object prioritizer (104*b*) is configured to prioritize at least one of the objects of the plurality of objects based on the analyzed movement area, the scene attributes and the user context. The animation effect identifier (104*e*) is configured to identify an animation effect to be applied on each of the plurality of objects. Further, the new object identifier (104*c*) is configured to identify at least one new animation object based on the scene category, the plurality of objects and the plurality of scene attributes.

The direction, speed and displacement module (106) includes a direction identifier (106*a*), a speed identifier (106*b*) and a displacement area identifier (106*c*). The displacement area identifier (106*c*) is configured to identify the displacement area for the at least one of the prioritized objects of the plurality of objects. Further, the direction identifier (106*a*) is configured to identify direction of the plurality of objects based on the AABBs and the OBBs. Furthermore, the speed identifier (106*b*) is configured to identify speed of the plurality of objects by using a regression model. The detailed explanation of the regression model is explained in further description.

The rendering module (108) includes an object renderer (108*a*). The rendering module (108) is configured to animate and render the at least one of the prioritized objects within the identified displacement area to generate the animation from the static image. The final rendering of object results in a smooth animation effect of the static image.

Figure 1A:
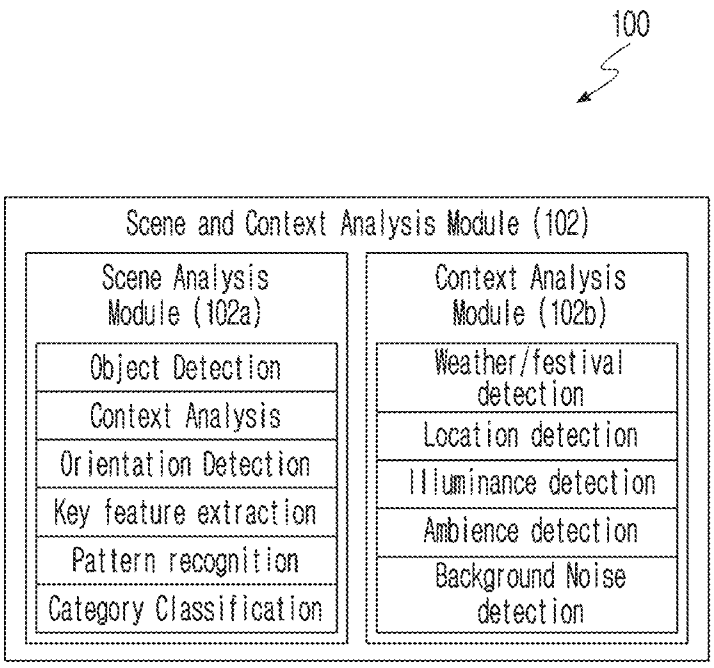
FIG. 1A illustrates a detailed block diagram of a scene and context analysis module of the overall architecture of the system, according to an embodiment of the disclosure.

FIG. 1A illustrates a detailed block diagram of a scene and context analysis module of the overall architecture of the system, according to an embodiment of the disclosure.

The scene analysis module (102*a*) involves a Convolutional Neural Network (CNN) or a variant of CNN that is configured to analyze the static image and to identify the scene category and the plurality of objects in the image. It is further configured to identify a plurality of scene attributes such as the Axis Aligned Bounding Box (AABB) and the Orientation Bounding Box (OBB) of each of the plurality of objects with the scene category. These scene attributes (AABB, OBB) are used by further modules to identify the animation objects in the static image. Further, the context analysis module (102*b*) is configured to analyze user surroundings like ambience of a user, background noise from a plurality of sensors and determine on the current user context for instance loud music noise is related to party. The context analysis module is also configured to consider the user's location, weather or any festival by using GPS information of the user, calendar and weather forecast, from plurality of applications or internet, such as winter season, snow, rainy season, Diwali and the like. Later, the identified user context from the context analysis module (102*b*) is utilized into the scene analysis module (102*a*) to identify the plurality of objects based on the current user context.

Figure 1B:
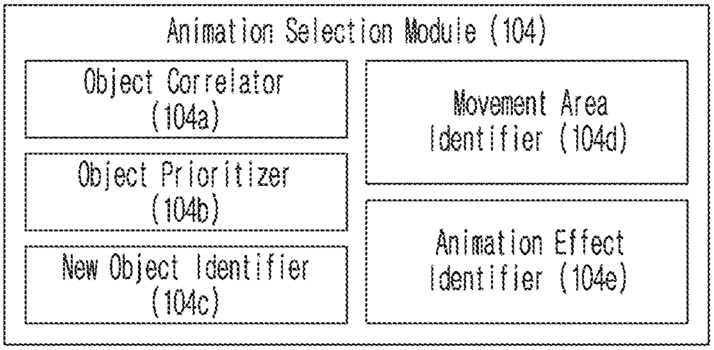
FIG. 1B illustrates a detailed block diagram of an animation selection module of the overall architecture of the system, according to an embodiment of the disclosure.

FIG. 1B illustrates a detailed block diagram of an animation selection module of the overall architecture of the system, according to an embodiment of the disclosure.

Based on the scene category, the plurality of objects, the plurality of scene attributes (AABB, OBB) and the user context identified in the scene and context analysis module (102), the animation selection module (104) is configured to determine the final animation objects with its animation effect from the static image. It is further configured to identify new animation objects based on the scene category and the plurality of objects.

The plurality of objects are first passed through the Object Correlator (104*a*) which is configured to identify the correlation among the plurality of objects based on the plurality of scene attributes. Further, the Movement Area Identifier (104*d*) is configured to determine the movement area of the plurality of objects based on the scene attributes, the identified correlation and the scene category. The plurality of objects are classified as movable or immovable with respect to the static image. Further, the movement area of the classified objects is identified. The movement area is one of outside the bounding box and within the bounding box. The movement area of the classified objects which is outside the bounding box is relative to another object of the plurality of objects.

Further, the plurality of objects with the scene category are also passed through the Animation Effect Identifier (104*e*) which is configured to identify at least one new animation effect for one of the plurality of objects, classified as immovable based on the user context, the scene category and the plurality of scene attributes. The one new animation effect includes blinking, change in the color, rotation, shimmer and the like. Additionally, the scene category and the plurality of objects with its AABB can also be passed through the New Object Identifier (104*c*) that is configured to identify at least one new animation object based on the scene category, the plurality of objects and the plurality of scene attributes. This new animation object is corresponding to the static image and with their defined movement area and the animation effect, the new animation object is added in the list of animation objects.

Furthermore, the plurality of objects that can be animated are finally selected and the object prioritization is done based on the user context data that includes the ambience of the user, background noise from multiple sensors, weather, occasion, lighting condition, location of the user and the like. The objects are listed in a prioritized order wherein each of the plurality of objects are associated with a priority score and if an object's score is less than the minimum threshold as compared to the another objects, it is not selected for further processing. Further, the prioritizing of the at least one of the plurality of objects with the priority score greater than a threshold can be based on a decision tree model.

In the implementation, the plurality of objects with its AABB's are provided to the object correlator (104*a*) to identify the association between the objects and their relevance with the static image. For instance, a boat has a relation with sea but not with sky, clouds have a relation with the sky but not with the sea, the rain has a relation with the complete scene, a bird flying in the sky having its bounding box overlapping with the sky has a relation with the sky, a duck having bounding box overlapping with a river has a relation with the river but not with the sky, a car has a relation with a road. In view of the same, a Pearson's correlation can be used to measure the association between the plurality of objects based on their bounding box coordinates.

In the implementation, the movement area identifier (104*d*) identifies the area of animation for the movable objects based on the object, its scene attributes, the scene category and the correlation score. The animation effect to be applied on the movable objects can be motion. Further, the movement area identifier (104*d*) also identifies whether given object is movable or not with respect to the scene. For instance, the area of animation of duck is river, the area of animation of rain is complete scene, the area of animation of waterfall is waterfall's own bounding box. Some objects animate in its own bounding box while some animate in another object's bounding box. A feed forward network with a unified SoftMax classification layer can be utilized to classify object as movable or immovable and also label area of movement for all movable components.

Each of the plurality of objects has its own movement area. This movement area can be categorized in two types. First one is within the object bounding box, for instance waterfall moving in its own bounding box, river moving in its own bounding box. Second one is outside the object the bounding box that is movement inside the correlated object bounding box, for instance leaves, snow, rainfall moving in the scene bounding box, car moving in the bounding box of road and boat moving in the bounding box of river.

In the implementation, the animation effect identifier (104*e*) identifies the animation effect other than motion, on the objects that are classified as immovable. The other animation effects include rotation, blinking, change in color, zoom in, zoom out are added by the animation effect identifier (104*e*). The scene category with the plurality of objects and its AABB's are passed through the animation effect identifier (104*e*) to identify the animation effects which can be applied to these objects. These animation effects have a movement area as within the bounding box of the object. The animation effect identifier (104*e*) takes the scene category, the plurality of objects with their AABB's and identifies the animation effect which is to be applied to the object.

In another embodiment, the new object identifier (104*c*) identifies the new object which can be added to the static image for providing better user experience. The new object based on the scene category, the existing objects and their AABB's is identified with the animation effect and the movement area. The new object identifier (104*c*) has a fixed set of objects and their animation effect and the movement area. When input is given like the scene category and the existing objects with AABB, the new object identifier (104*c*) analyzes the input and adds new objects with their movement area and their animation effect. This new object image will be searched and fetched from an existing library. If the object does not exist in library, then no object will be added for the animation effect.

In the implementation, the object prioritizer (104*b*) analyzes the data received from the new object identifier (104*c*) and prioritizes the animation objects and priority score is determined for each object. The objects having priority score greater than threshold will be considered for animation in that image. The plurality of objects, their AABB's, the user context and the union of object animations are considered from the movement area identifier (104*d*), the animation effect identifier (104*e*) and optionally, the new object identifier (104*c*). Finally, the object prioritizer (104*b*) prioritizes the animation objects. In a non-limiting example, a decision tree based model is configured to select and prioritize the objects as animation objects. The prioritization will be done on the animation objects based on its bounding box as well as movement area and the animation effect and also considering the external factors like weather, season, ambience as user context.

Figure 1C:
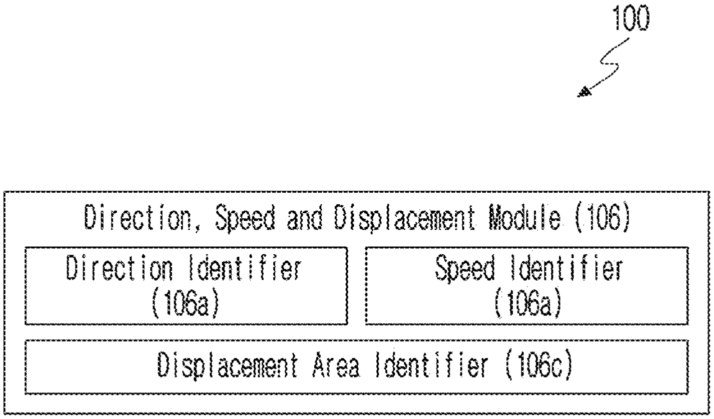
FIG. 1C illustrates a detailed block diagram of a direction, speed and displacement module of the overall architecture of the system, according to an embodiment of the disclosure.

FIG. 1C illustrates a detailed block diagram of a direction, speed and displacement module of the overall architecture of the system, according to an embodiment of the disclosure.

The direction of the plurality of objects are identified based on the AABB, the OBB and the object itself. In a non-limiting example, a Multitask Model-CNN combined with artificial neural network (ANN) multilayer perceptron (MLP) can be used for this task. The MLP model considers the object and its scene attributes (AABB and OBB). Further, for speed identification, a pre-trained dataset and image with AABB and OBB are fed to the CNN network. The integrator component will merge output of these two model features to generate the final output providing direction and speed of the plurality objects. Further, the region based object segmentation is used to identify the boundary region and object mask and use it for determining the displacement area. This displacement information along with the movement area information (within BB or outside BB) is provided to the object renderer (108*a*) for final animation. Further, the displacement area identifier (106*c*) takes the animation object and the movement area from the animation selection module (104) and calculates the mask of movement area with respect to animation object. The animation object can be moved in the movement area of the object respecting the boundaries of area of movement object. For instance, clouds will move within the boundaries of sky, a boat will move within the boundaries of river, a lake and a waterfall will move in its own boundaries.

In a non-limiting example, color thresholding can be used to find the centroid of the movement area based on which the displacement area can be calculated for movement. Finding a reference color which can be center of bounding box of movement area object and then thresholding of Cartesian distances to it from every pixel color $f(x,y)=(R(x,y),G(x,y),B(x,y))$.

Figure 1D:
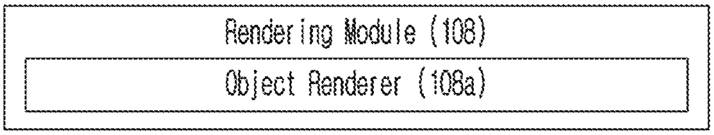
FIG. 1D illustrates a detailed block diagram of a rendering selection module of the overall architecture of the system, according to an embodiment of the disclosure.

FIG. 1D illustrates a detailed block diagram of a rendering selection module of the overall architecture of the system, according to an embodiment of the disclosure.

Once the animation object, the animation effect, the displacement area, the direction and mask of displacement area is identified, the object is rendered in the given movement area and a direction is applied to the objects giving a smooth animation in the static image. Various image displacement techniques are applied to generate animation effect. The objects movement is combined to generate scene animation effect. Further, different animations will be generated for same image based on the user context or random selection to give surprising and unpredictable animation effects.

Figure 2:
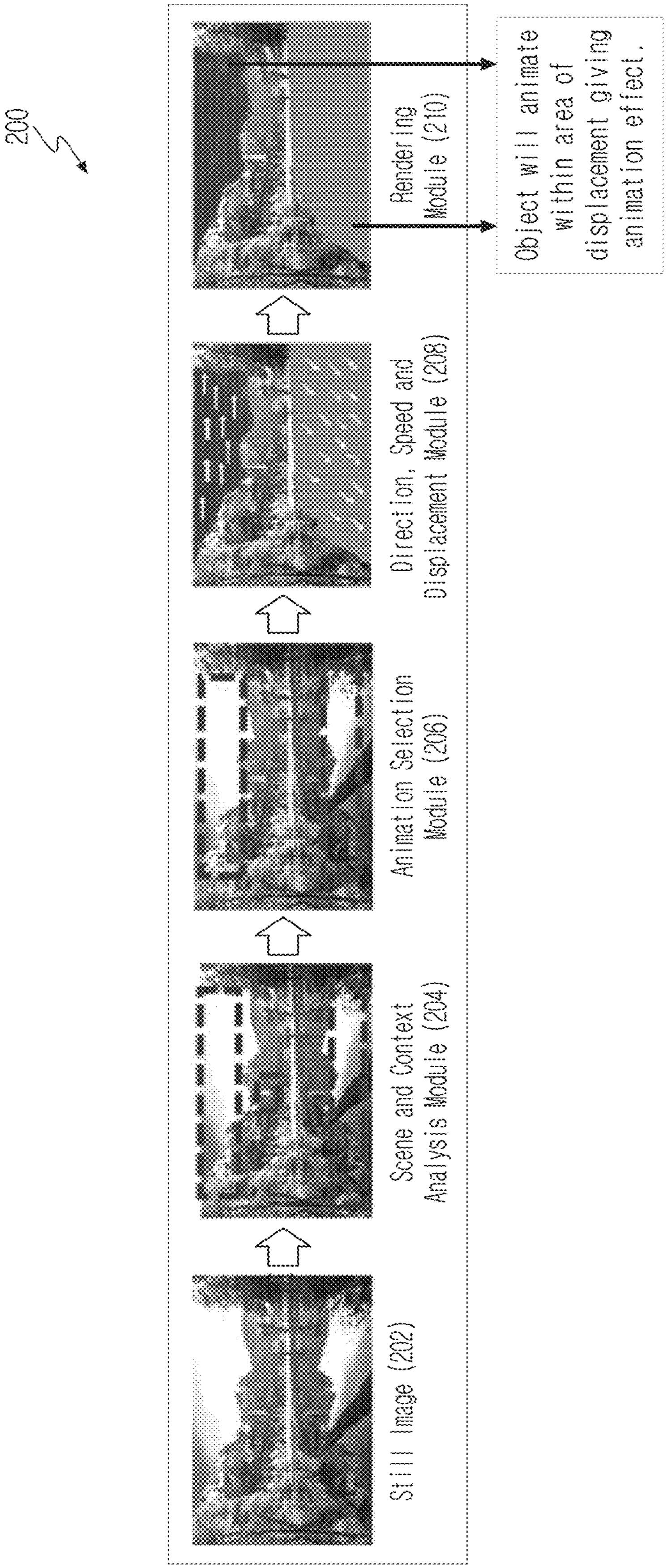
FIG. 2 illustrates an implementation of automatically generating context specific animation from a static image, according to an embodiment of the disclosure.

FIG. 2 illustrates an implementation of automatically generating context specific animation from a static image, according to an embodiment of the disclosure.

The scene and context analysis module (204) is configured to analyze the static image (202) to determine a scene category, a plurality of objects, and a plurality of scene attributes. The scene and context analysis module (204) is further configured to identify a user context. The system 200 further includes an object correlator of an animation selection module (206) which is configured to determine correlation among the plurality of objects based on the plurality of scene attributes. Further, a movement area identifier of the animation selection module (206) is configured to analyze a movement area of the plurality of objects based on the correlation, the plurality of scene attributes and the scene category. An object prioritizer of the animation selection module (206) is configured to prioritize at least one of the objects of the plurality of objects based on the analyzed movement area, the scene attributes and the user context. Further, the system includes a displacement area identifier of a direction, speed and displacement module (208) is configured to identify a displacement area for the at least one of the prioritized objects of the plurality of objects and a rendering module (210) is configured to animate and render the at least one of the prioritized objects within the identified displacement area to generate the animation from the static image.

Figure 3:
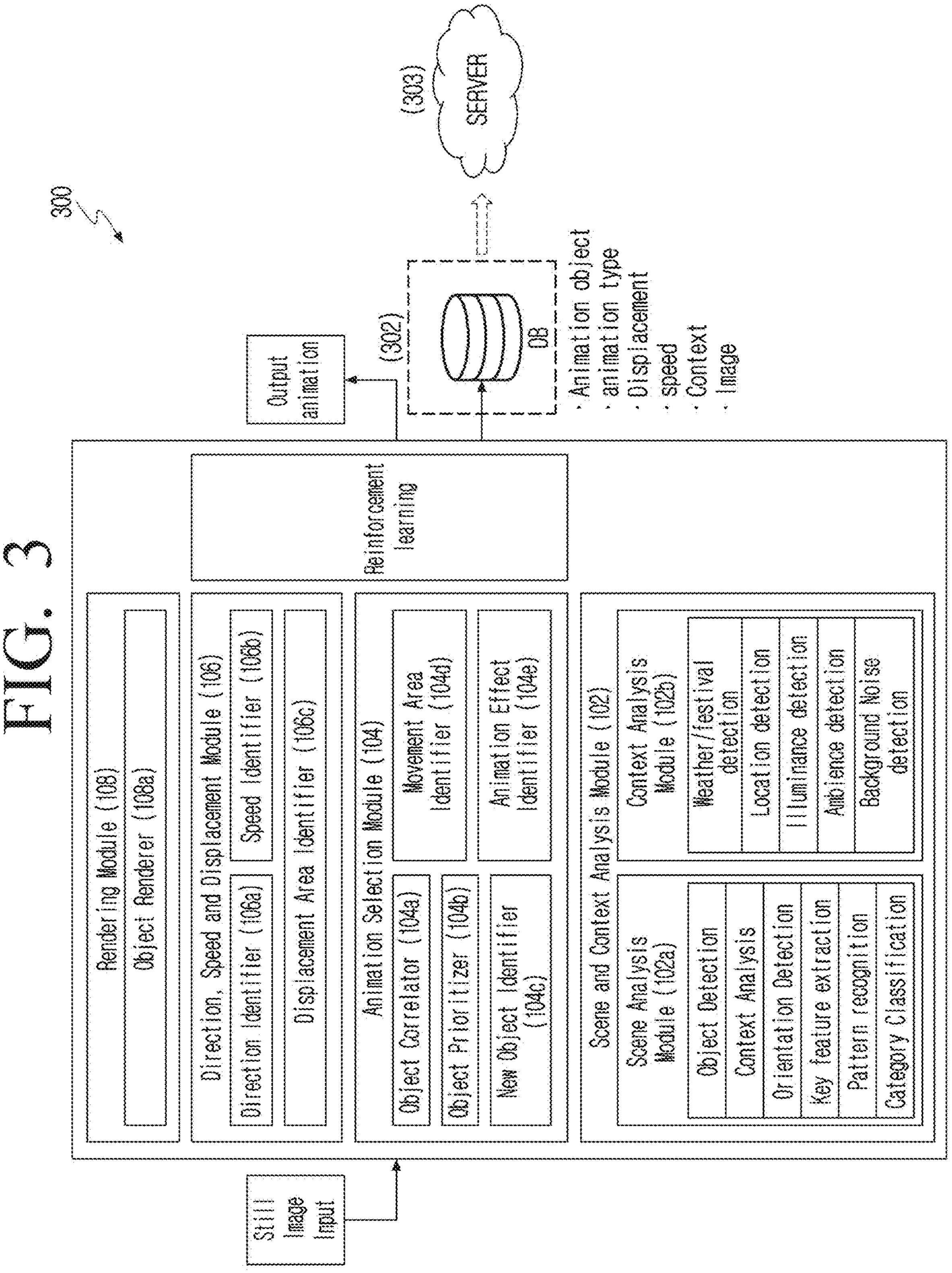
FIG. 3 illustrates another architecture of a system for generation of an animation of a static image that includes a database and a server, according to an embodiment of the disclosure.

FIG. 3 illustrates another architecture of a system for generation of an animation of a static image that includes a database and a server, according to an embodiment of the disclosure.

The image metadata and all the scene attributes along with the entire information as discussed above are stored in the database (DB) (302) which will be finally stored on the server (303). When the static image will appear, the DB (302) will be looked upon to fetch the details. This will save future processing of animation objects and its information such as the speed, the displacement and the direction identification for the same static image and have better performance.

In the implementation, the server 303 includes, but are not limited to, a proxy server, a mail server, a web server, an application server, real-time communication server, an FTP server and the like.

In the implementation, the database (DB) (302) may be implemented as, but not limited to, enterprise database, remote database, local database, and the like. Further, the DB (302) may themselves be located either within the vicinity of each other or may be located at different geographic locations. Furthermore, the DB (302) may be implemented inside or outside the system 300 and the DB (302) may be implemented as a single database.

Figure 4:
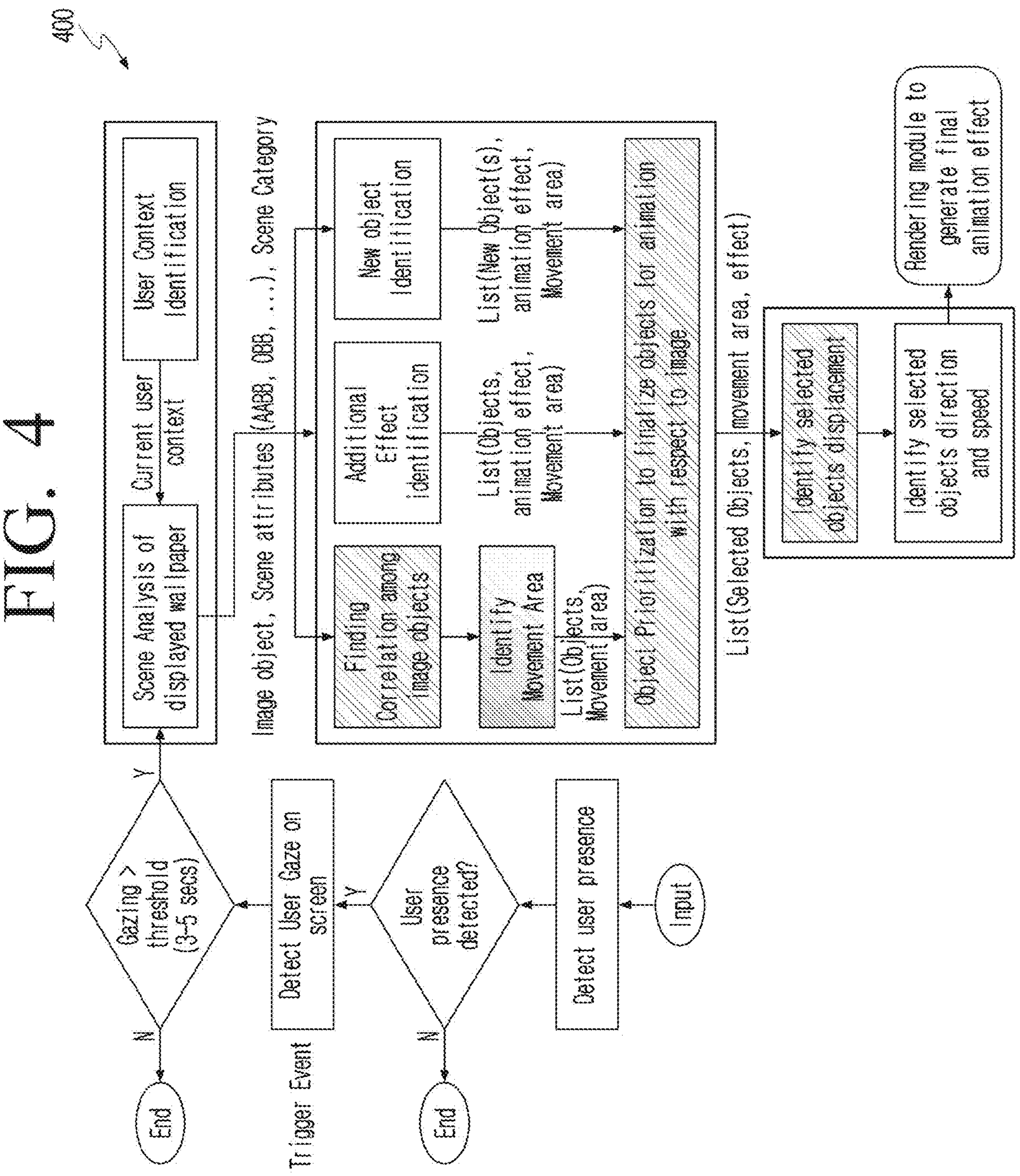
FIG. 4 is a flowchart illustrating the detailed flow of the method for automatically generating context specific animation from a static image, according to an embodiment of the disclosure.

FIG. 4 is a flowchart illustrating the detailed flow of the method for automatically generating context specific animation from a static image, according to an embodiment of the disclosure.

The detailed flow of the method in flowchart 400 is explained herein. Firstly, a user presence detection is done via TV camera or other sensors. Further, an activation event such as gazing is identified and when gaze>threshold (e.g., >3-5 secs), image processing for animation is started. The current user context, such as location of the user, weather, ambience, festival, and the like, is identified. Further, identifying the scene category, the plurality of objects and its scene attributes like Axis Aligned Bounding Box (AABB) and Orientation Bounding Box (OBB) by using various models such as State of the Art (SOTA) model and the like. Also apply identified user context on the static image to generate selected objects and attributes for further processing and animations. Further, the correlation is determined among the above identified objects. Further, identifying the movement area of the identified movable objects wherein the animation effect of the movable objects can be motion. Further, identifying the additional animation effect other than motion like blinking, color change, rotation and the like on objects identified as immovable, in the static image. Optionally, identifying new objects which can be added in the scene, with their animation effect and the movement area. Further, prioritizing the objects based on the user context, the movement area, the scene category to finalize the optimal objects for animation. Further, identifying speed, direction and displacement area of finalized animation objects based on the movement area and the animation effect. Further, identifying the finalized animation objects direction and speed and applying animation on the finalized objects using speed, direction and displacement area identified.

Figure 5:
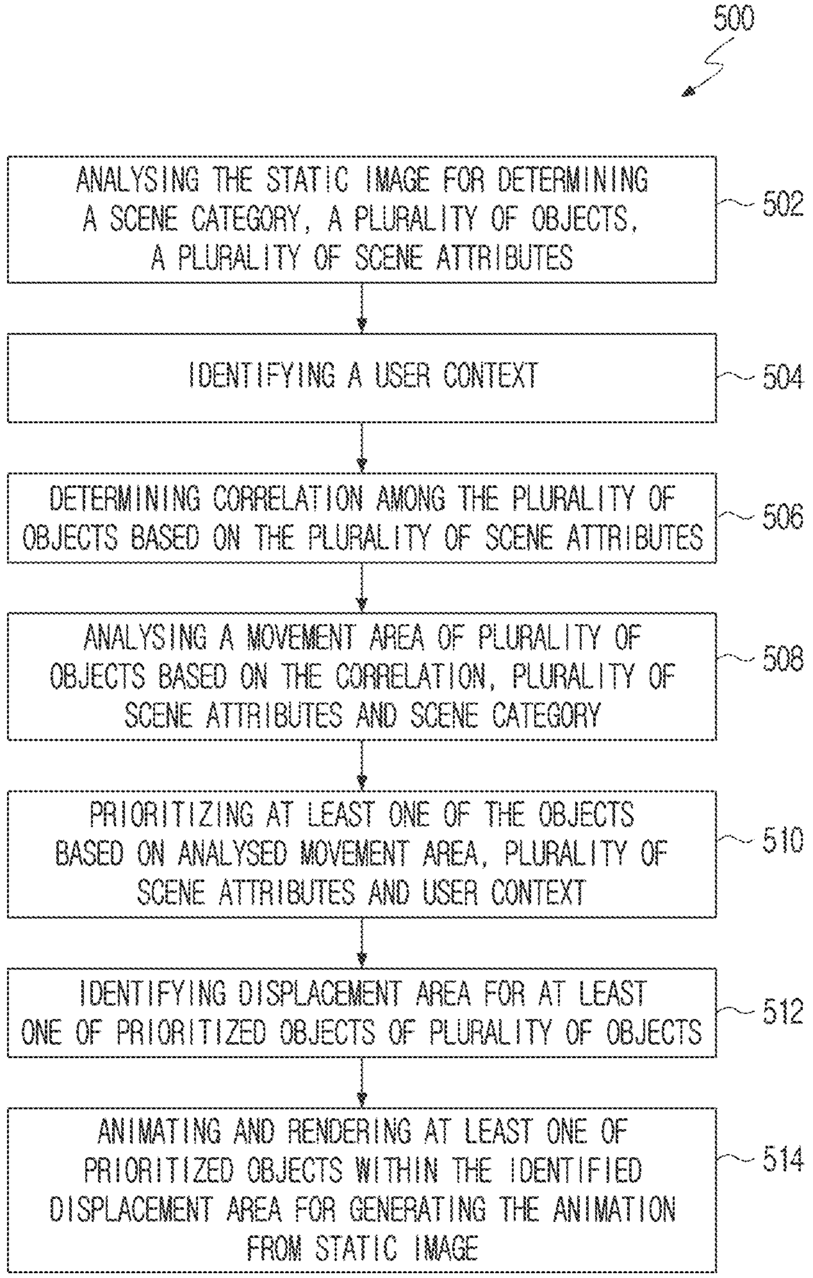
FIG. 5 is a flowchart illustrating a method for generating an animation of a static image, according to an embodiment of the disclosure.

FIG. 5 is a flowchart illustrating a method for generating an animation of a static image, according to an embodiment of the disclosure.

At operation 502 of flowchart 500, analyzing the static image for determining a scene category, a plurality of objects, and a plurality of scene attributes. At operation 504, identifying a user context. At operation 506, determining correlation among the plurality of objects based on the plurality of scene attributes. At operation 508, analyzing a movement area of the plurality of objects based on the correlation, the plurality of scene attributes and the scene category. At operation 510, prioritizing at least one of the objects of the plurality of objects based on the analyzed movement area, the scene attributes and the user context. At operation 512, identifying a displacement area for the at least one of the prioritized objects of the plurality of objects. At operation 514, animating and rendering the at least one of the prioritized objects within the identified displacement area for generating the animation from the static image.

Figure 6:
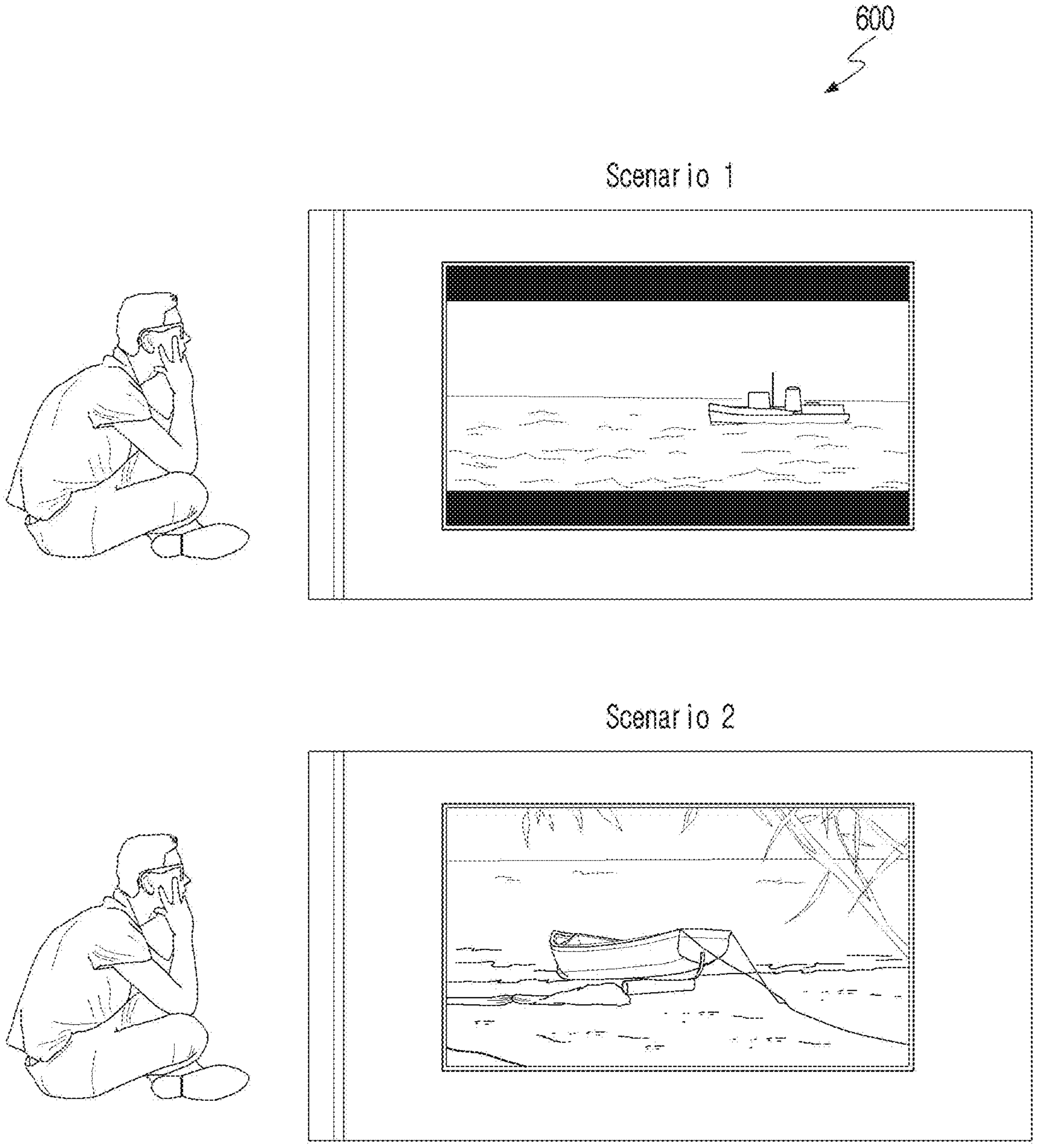
FIG. 6 illustrates an implementation of the significance of correlation between plurality of objects, according to an embodiment of the disclosure.

FIG. 6 illustrates an implementation of the significance of correlation between plurality of objects, according to an embodiment of the disclosure.

The importance of correlation between plurality of objects is explained herein. An object which is movable may not be movable in context with image. For instance, in these two scenarios 600 as shown in this FIG. 6, in scenario 1, a boat/ship is in a sea and the bounding box of the sea plays a significant place in image scene. In the scenario 1, the boat is movable in the scene. In scenario 2, a boat is on the side of the sea which is docked at the shore. In the scenario 2, the boat is not movable in the scene. From these two scenarios, it is evident that the correlation between plurality of objects is important.

Figure 7A:
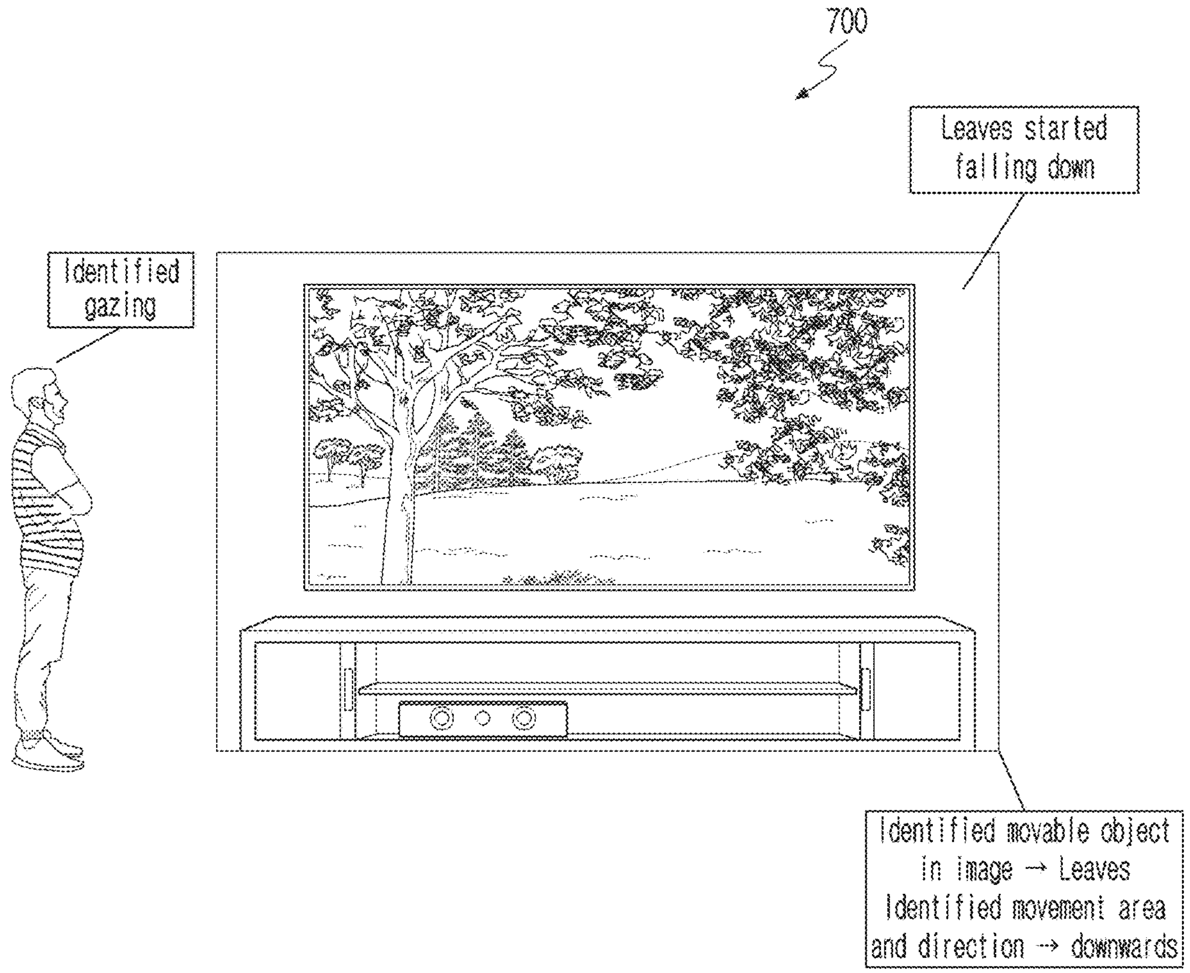
FIG. 7A is a use case scenario illustrating an animation of a wallpaper on a Frame/quantum dot light emitting diodes (QLED)/Sero television (TV), according to an embodiment of the disclosure.

FIG. 7A is a use case scenario illustrating an animation of a wallpaper on a Frame/QLED/Sero TV, according to an embodiment of the disclosure.

An activation event such as user gazing at the frame/QLED/Sero TV 700 is identified. Thus, the device identifies gazing via camera on the frame/QLED/Sero TV 700. The device starts applying intelligence to the static wallpaper. The animation effect is applied and device shows this animation effect which is leaves falling downwards on the displayed static image. Thus, the user has a pleasant experience. Once the gazing is stopped, the animation is stopped and again the static wallpaper is displayed to the user.

Figure 7B:
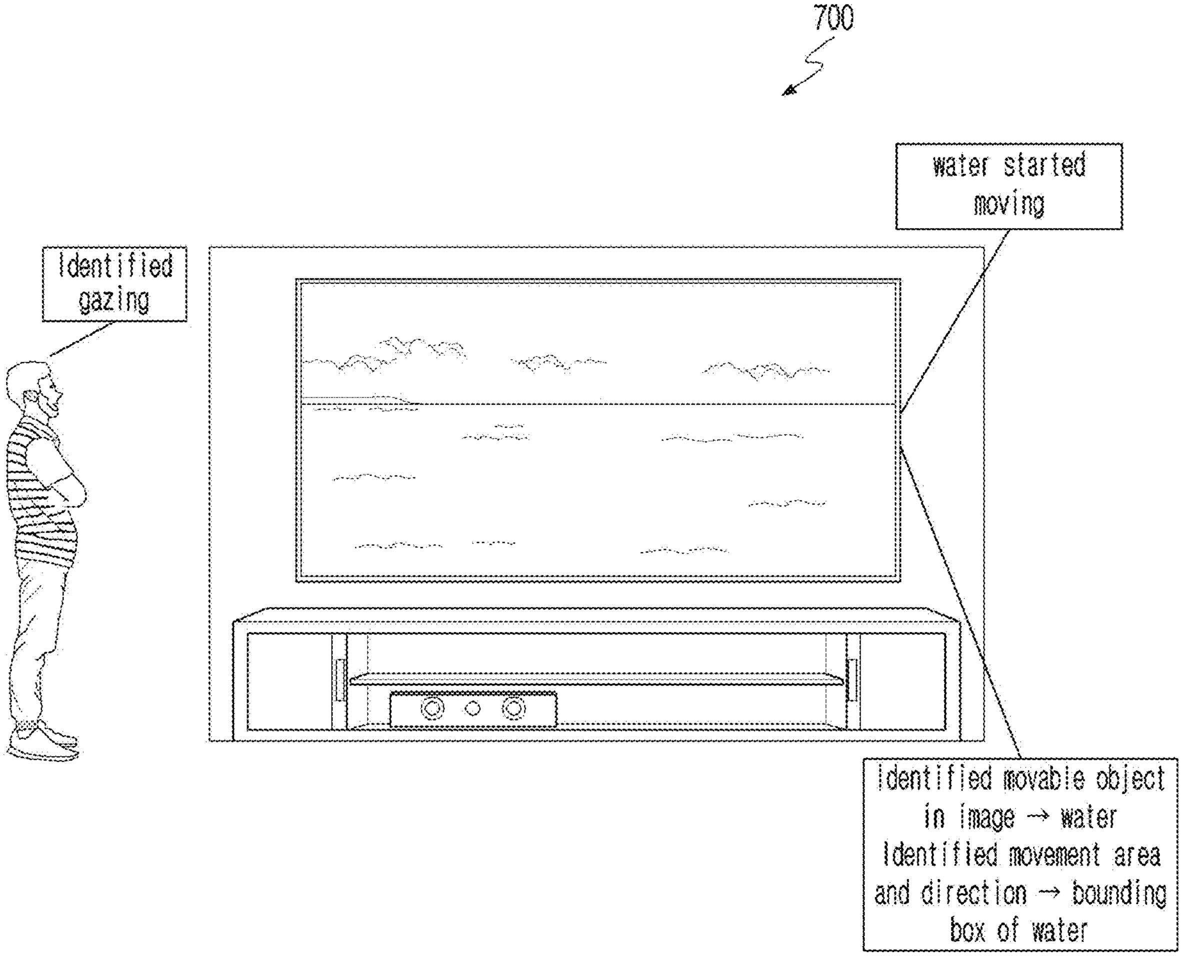
FIG. 7B is another use case scenario illustrating an animation of a static image, according to an embodiment of the disclosure.

FIG. 7B is another use case scenario illustrating an animation of a static image, according to an embodiment of the disclosure.

FIG. 7B depicts a user gazing at a Frame/Sero TV wallpaper. In this use case, the device identifies gazing, which is the activation event, via a camera or by combination of sensors. The device starts applying intelligence to the static wallpaper. The animation effect is applied and device shows this animation effect which is movement of water on the displayed static image. Thus, the user has a pleasant experience. Once the activation event is stopped, the animation is stopped.

Figure 8:
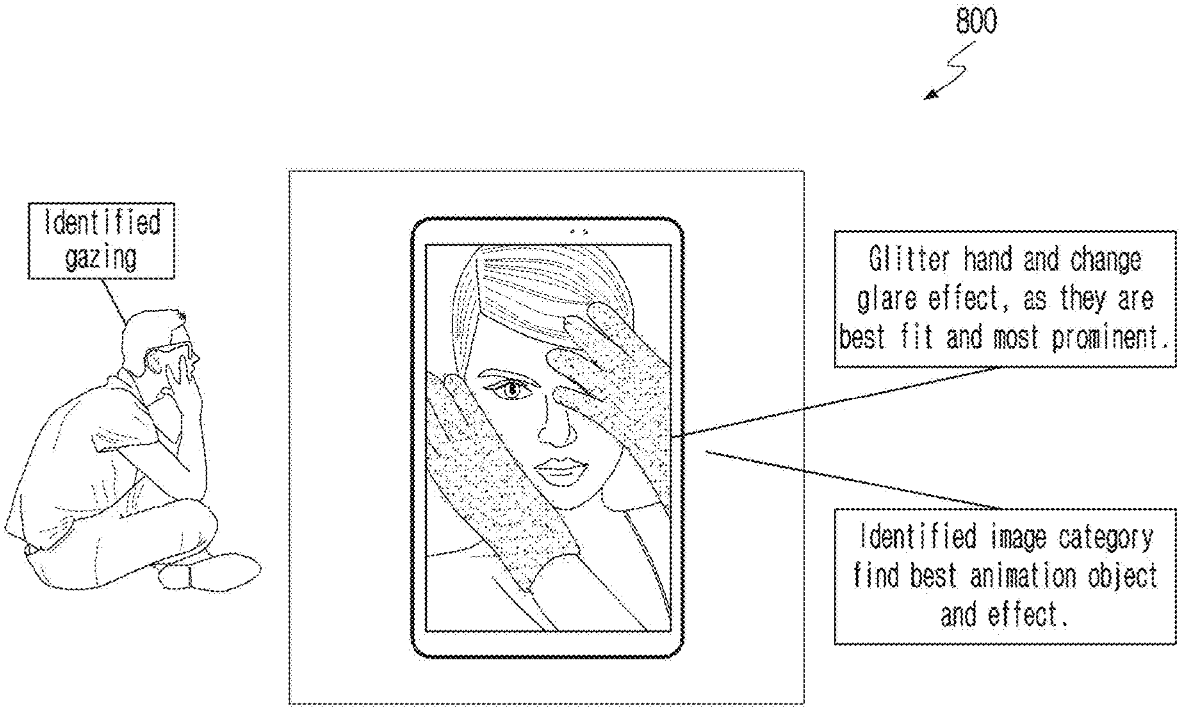
FIG. 8 is a use case scenario illustrating an animation of a wallpaper on a mobile, tab device, according to an embodiment of the disclosure.

FIG. 8 is a use case scenario illustrating an animation of a wallpaper on a mobile, tab device, according to an embodiment of the disclosure.

An activation event such as user gazing at the tab device or mobile wallpaper 800. Thus, the device identifies gazing via camera. The device starts applying intelligence to the static wallpaper. The animation effect is applied and device shows this animation effect which is glitter hands and glare effect on the displayed static image. Thus, the user has a pleasant experience. Once the gazing is stopped, the animation is stopped and again the static wallpaper is displayed to the user.

Figure 9:
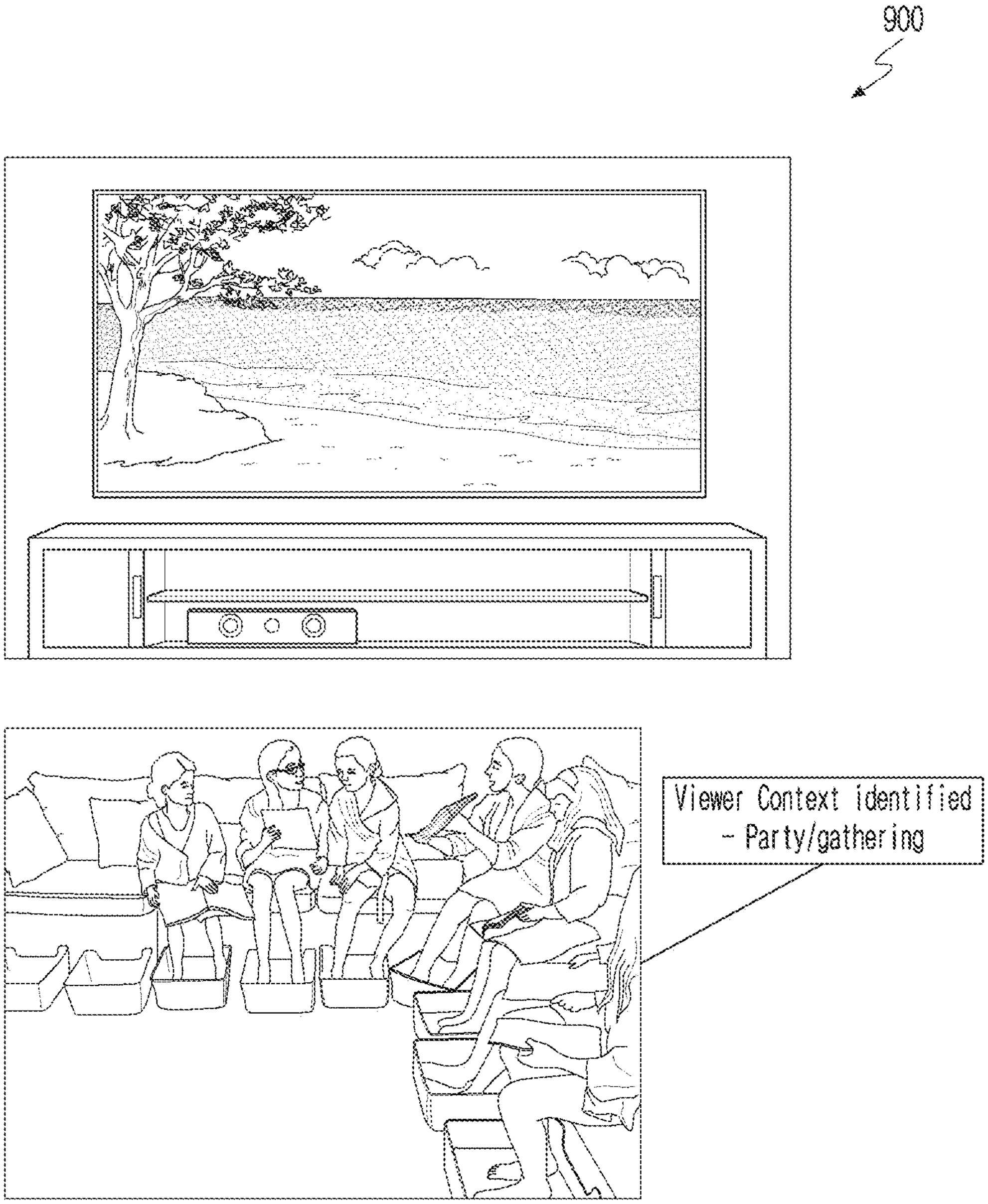
FIG. 9 is a use case scenario illustrating an animation of a wallpaper on a based on the user context, according to an embodiment of the disclosure.

FIG. 9 is a use case scenario illustrating an animation of a wallpaper on a based on the user context, according to an embodiment of the disclosure.

In this figure, an activation event such as viewer context change or ambience change such as lights ON is identified by the device. The device starts applying intelligence to the static wallpaper 900. The animation effect is applied and device shows this animation effect which is lighting and party effect on the displayed static image. Thus, the user has a pleasant experience. Once the activation event is stopped, the static image again stops the animation is stopped and again the static wallpaper is displayed to the user.

Figure 10:
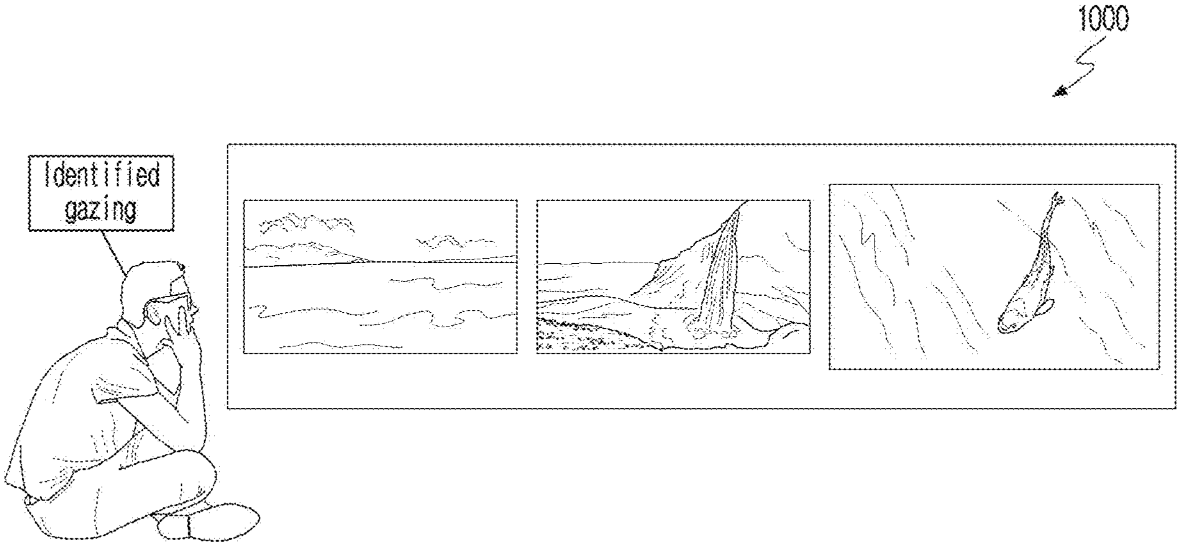
FIG. 10 is a use case scenario illustrating an animation of photos in the gallery of the user's device, according to an embodiment of the disclosure.

FIG. 10 is a use case scenario illustrating an animation of photos in the gallery of the user's device, according to an embodiment of the disclosure.

In this use case, it is illustrated that a user clicks beautiful pictures of his visit to Europe. When the user returned from the trip, the user was watching his photo gallery 1000. His device has this intelligence feature which is activated. An activation event such as the user gazing via camera or manual command for animation is identified by the device. The device animates the static image. Each time the user views his photo gallery, a new animation effect can be seen based on the user context and the user feedback. It becomes a pleasant experience for the user to see the memories becoming live. Once the activation event is stopped, the animation is stopped.

Figure 11:
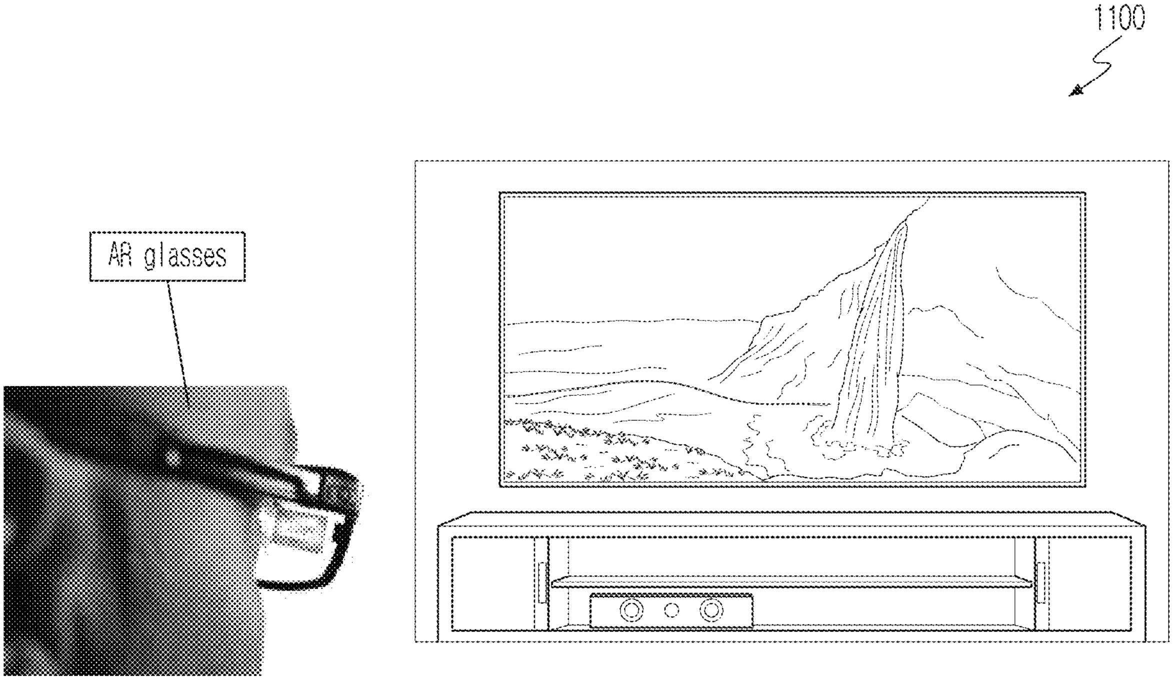
FIG. 11 is a use case scenario illustrating an animation of a static image while using Augmented Reality (AR) glasses, according to an embodiment of the disclosure.

FIG. 11 is a use case scenario illustrating an animation of a static image while using Augmented Reality (AR) glasses, according to an embodiment of the disclosure.

In this use case, a user is watching an image on the TV 1100. When the user watches the image using AR glasses, the user's device has this intelligence feature activated. The device identifies the activation event which is using the AR glasses. Thus, the device animates the static image and the user will watch the TV images animating. Once the user removes the AR glasses, the images will be static again.

Figure 12:
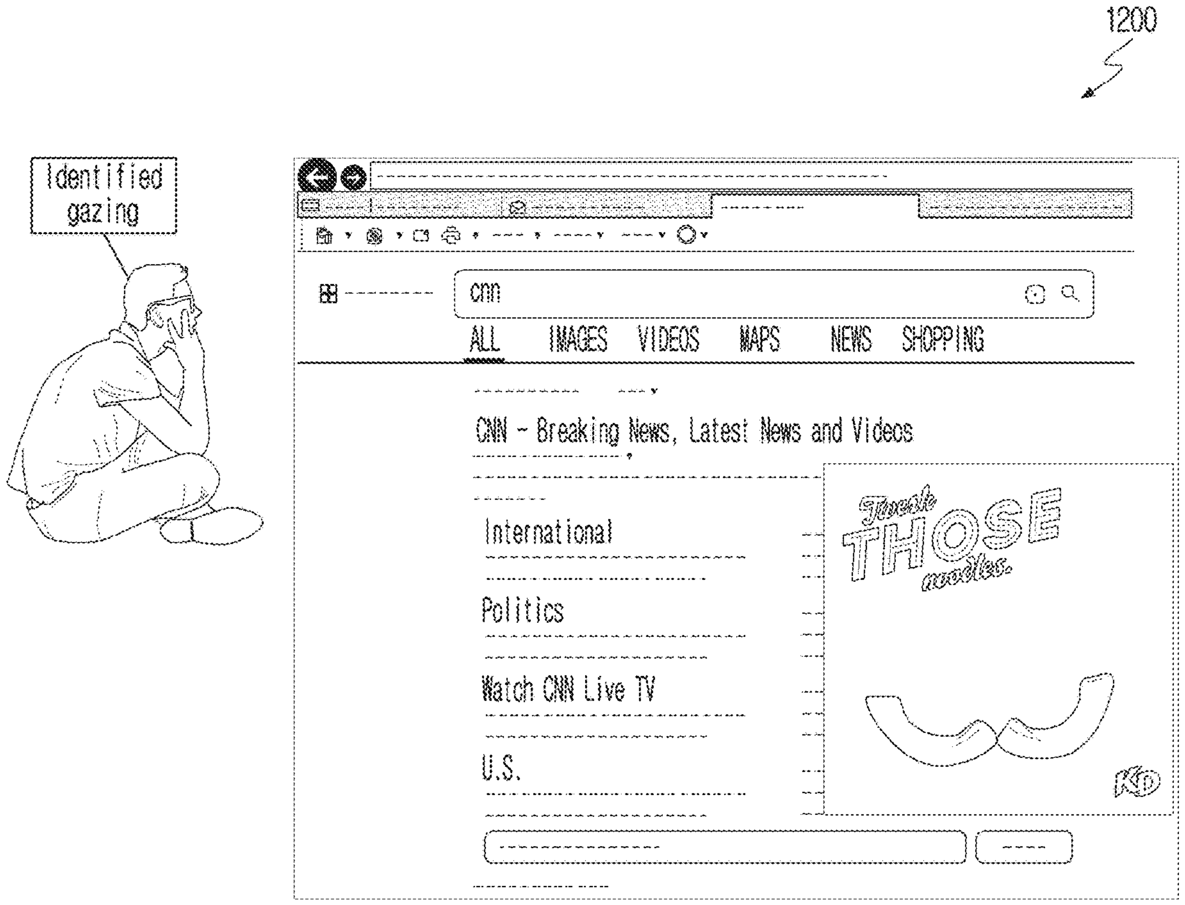
FIG. 12 is a use case scenario illustrating an animation of an advertisement while browsing through websites, according to an embodiment of the disclosure.

FIG. 12 is a use case scenario illustrating an animation of an advertisement while browsing through websites, according to an embodiment of the disclosure.

In this use case, a user is watching a webpage 1200 on an internet browser and a webpage has an advertisement image as shown in the figure. When the user gazes at that advertisement image, the user's device has this intelligence feature activated. The device identifies the user gazing via camera or it can be a periodic event to animate image. Thus, the device animates the static advertisement image and the advertisement will be more impactful and catchier. Once the activation event of gazing is stopped, the animation is stopped.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A method for generating an animation from a static image, the method comprising:
- identifying a scene category, a plurality of objects, and a plurality of scene attributes based on the static image;
- identifying relevance of the plurality of objects with respect to the static image;
- identifying correlation among the plurality of objects based on the identified relevance of the plurality of objects, and the plurality of scene attributes;
- identifying a movement area of the plurality of objects based on the correlation, the plurality of scene attributes and the scene category, wherein the movement area is an area of animation for movable objects of the plurality of objects;
- identifying at least one of object of the plurality of objects based on the movement area, the scene attributes and a user context;
- identifying a displacement area for the at least one of the object of the plurality of objects, wherein the displacement area is an area for identifying the object within the static image; and
- generating the animation from the static image by animating and rendering the at least one of the object within the identified displacement area.

2. The method of claim 1, wherein the plurality of scene attributes includes Axis Aligned Bounding Boxes (AABBs) and Orientation Bounding Boxes (OBBs).

3. The method of claim 1, further comprising:
- identifying user surroundings including ambience of a user, background noise from multiple sensors, weather, occasion, lighting condition, or location of the user;
- identifying the user context based on the identified user surroundings; and
- identifying the plurality of objects based on the user context.

4. The method of claim 1, wherein the correlation among the plurality of objects is determined using Pearson's correlation coefficient.

5. The method of claim 1, further comprising:
- classifying the plurality of objects as movable or immovable with respect to the static image; and
- identifying the movement area of the classified objects, wherein the movement area is one of outside a bounding box or within the bounding box.

6. The method of claim 5, wherein the movement area of the classified objects which is outside the bounding box is relative to another object of the plurality of objects.

7. The method of claim 1, further comprising:
- identifying an animation effect to be applied on each of the plurality of objects.

8. The method of claim 1, further comprising:

identifying at least one new animation object based on the scene category, the plurality of objects and the plurality of scene attributes.

9. The method of claim 7, further comprising:

identifying at least one new animation effect for one of the plurality of objects, classified as immovable, based on the user context, the scene category and the plurality of scene attributes.

10. The method of claim 7, wherein the animation effect to be applied on one of the plurality of objects, classified as movable, is motion.

11. The method of claim 9, wherein the at least one new animation effect includes blinking, change in color, or rotation.

12. The method of claim 9, wherein the movement area for each new animation effect is within a bounding box of a corresponding object of the plurality of objects.

13. The method of claim 1, further comprising:

associating each of the plurality of objects with a priority score; and prioritizing at least one of the objects of the plurality of objects with the priority score greater than a threshold.

14. The method of claim 1, further comprising:

displaying the generated animation by applying the generated animation to the static image on at least one of a tab device, a mobile device, or a television.

15. The method of claim 1, wherein the animating and rendering is performed in response to detection of an activation event.

16. The method of claim 15, wherein the activation event comprises one of detection of a user gaze, detection of a user context change, reception of a manual command, a time-based event, or use of an augmented reality (AR) device.

17. The method of claim 15, wherein the animating and rendering is stopped in response to detection of an end of the activation event and the static image is displayed.

18. One or more non-transitory computer-readable storage media storing one or more computer programs including computer-executable instructions that, when executed by one or more processors of an electronic device, cause the electronic device to perform operations, the operations comprising:

identifying a scene category, a plurality of objects, and a plurality of scene attributes based on a static image;

identifying relevance of the plurality of objects with respect to the static image;

identifying correlation among the plurality of objects based on the identified relevance of the plurality of objects, and the plurality of scene attributes;

identifying a movement area of the plurality of objects based on the correlation, the plurality of scene attributes and the scene category, wherein the movement area is an area of animation for movable objects of the plurality of objects;

identifying at least one of object of the plurality of objects based on the movement area, the scene attributes and a user context;

identifying a displacement area for the at least one of the object of the plurality of objects, wherein the displacement area is an area for identifying the object within the static image; and generating the animation from the static image by animating and rendering the at least one of the object within the identified displacement area.

19. The one or more non-transitory computer-readable storage media of claim 18, the operations further comprising:

identifying user surroundings including ambience of a user, background noise from multiple sensors, weather, occasion, lighting condition, or location of the user;

identifying the user context based on the identified user surroundings; and identifying the plurality of objects based on the user context.

20. The one or more non-transitory computer-readable storage media of claim 18, the operations further comprising:

classifying the plurality of objects as movable or immovable with respect to the static image; and identifying the movement area of the classified objects, wherein the movement area is one of outside a bounding box or within the bounding box.

* * * * *